(12) United States Patent
Ramesh (10) Patent No.: US 7,092,954 B1
(45) Date of Patent: *Aug. 15, 2006

(54) OPTIMIZING AN EQUI-JOIN OPERATION USING A BITMAP INDEX STRUCTURE

(75) Inventor: Bhashyam Ramesh, San Diego, CA (US)

(73) Assignee: NCR Corporation, Dayton, OH (US)

( * ) Notice: Subject to any disclaimer, the term of this patent is extended or adjusted under 35 U.S.C. 154(b) by 511 days.

This patent is subject to a terminal disclaimer.

(21) Appl. No.: 10/038,673

(22) Filed: Dec. 31, 2001

(51) Int. Cl.
*G06F 17/00* (2006.01)

(52) U.S. Cl. .................................. 707/100; 707/101

(58) Field of Classification Search .............. 707/1, 707/2, 3, 4, 100, 101, 103; 711/170
See application file for complete search history.

(56) References Cited

U.S. PATENT DOCUMENTS

| 5,594,898 | A | * | 1/1997 | Dalal et al. ..................... 707/2 |
| 5,802,521 | A | * | 9/1998 | Ziauddin et al. ............. 707/101 |
| 5,864,842 | A | * | 1/1999 | Pederson et al. ............... 707/3 |
| 5,960,428 | A | * | 9/1999 | Lindsay et al. ................. 707/4 |
| 6,049,804 | A | * | 4/2000 | Burgess et al. ............. 707/100 |
| 6,615,206 | B1 | * | 9/2003 | Jakobsson et al. ............. 707/3 |
| 6,618,729 | B1 | * | 9/2003 | Bhashyam et al. .......... 707/101 |
| 6,957,210 | B1 | * | 10/2005 | Ramesh ......................... 707/2 |
| 6,957,222 | B1 | * | 10/2005 | Ramesh ...................... 707/101 |

* cited by examiner

*Primary Examiner*—Sam Rimell
*Assistant Examiner*—Jacob F. Betit
(74) *Attorney, Agent, or Firm*—Baker Botts (57) ABSTRACT

A method, computer program and database system are disclosed for joining a plurality of tables T1 through TN, where each of the tables has an associated Star Map, S1 through SN, respectively. Each Star Map includes bitmap entries having locations indexed by the hash of one or more values associated with one or more join key columns of its associated table. A bitmap entry in a Star Map, if set, indicates the presence of a row in its associated table that has entries in the one or more join key columns that together hash to the location of the bitmap entry. The method includes a) performing a Boolean operation using the bitmap entries of the Star Maps S1 through SN to produce a join Star Map SJ, b) using SJ to select rows from the tables T1 through TN, and c) joining the resulting rows to produce a join result.

43 Claims, 6 Drawing Sheets

OPTIMIZING AN EQUI-JOIN OPERATION USING A BITMAP INDEX STRUCTURE

BACKGROUND

Relational DataBase Management Systems (RDBMS) using a Structured Query Language (SQL) interface are well known in the art. The SQL interface has evolved into a standard language for RDBMS software and has been adopted as such by both the American National Standards Institute (ANSI) and the International Standards Organization (ISO). In an RDBMS, all data is externally structured into tables. A table in a relational database is two dimensional, consisting of rows and columns. Each column has a name, typically describing the type of data held in that column. As new data is added, more rows are inserted into the table. A user query selects some rows of the table by specifying clauses that qualify the rows to be retrieved based on the values in one or more of the columns.

The SQL interface allows users to formulate relational operations on the tables either interactively, in batch files, or embedded in host languages such as C, COBOL, etc. Operators are provided in SQL that allow the user to manipulate the data, wherein each operator performs functions on one or more tables and produces a new table as a result. The power of SQL lies on its ability to link information from multiple tables or views together to perform complex sets of procedures with a single statement.

The SQL interface allows users to formulate relational operations on the tables. One of the most common SQL queries executed by the RDBMS is the SELECT statement. In the SQL standard, the SELECT statement generally comprises the format: "SELECT <clause> FROM <clause> WHERE <clause> GROUP BY<clause> HAVING <clause> ORDER BY <clause>."The clauses generally must follow this sequence, but only the SELECT and FROM clauses are required.

Generally, the result of a SELECT statement is a subset of data retrieved by the RDBMS from one or more existing tables stored in the relational database, wherein the FROM clause identifies the name of the table or tables from which data is being selected. The subset of data is treated as a new table, termed the result table.

A join operation is usually implied by naming more than one table in the FROM clause of a SELECT statement. A join operation makes it possible to combine tables by combining rows from one table with another table. The rows, or portions of rows, from the different tables are concatenated horizontally. Although not required, join operations normally include a WHERE clause that identifies the columns through which the rows can be combined. The WHERE clause may also include a predicate comprising one or more conditional operators that are used to select the rows to be joined.

An equi-join operation combines rows from the tables identified in the FROM clause in which columns specified in the WHERE clause satisfy an equality relationship. A database system may execute such a query by comparing the specified columns in each row of each table according to the WHERE clause predicate.

SUMMARY

In general, in one aspect, the invention features a method for joining a plurality of tables T1 through TN, where each of the tables has an associated Star Map, S1 through SN, respectively. Each Star Map includes bitmap entries having locations indexed by the hash of one or more values associated with one or more join key columns of its associated table. A bitmap entry in a Star Map, if set, indicates the presence of a row in its associated table that has entries in the one or more join key columns that together hash to the location of the bitmap entry. The method includes a) performing a Boolean operation using the bitmap entries of the Star Maps S1 through SN to produce a join Star Map SJ, b) using SJ to select rows from the tables T1 through TN, and c) joining the resulting rows to produce a join result.

Implementations of the invention may include one or more of the following. The Boolean operation may include a logical AND. Using SJ to select rows from the tables T1 through TN may include for each set bitmap entry in SJ, searching T1 through TN for rows having values in their one or more join key columns that hash to the location of the set bitmap entry. Each bitmap entry in each Star Map may have an associated row number and column number. The row number and the column number for a set bitmap entry in a Star Map may be combined to produce a value that corresponds to the hash value of the one or more join key columns of the Star Map's associated table. At least one of the tables T1 through TN may be ordered by the hash of the values of its one or more join key columns.

In general, in another aspect, the invention features a method for joining a plurality of tables T1 through TN, where each of the tables has an associated Star Map, S1 through SN, respectively. Each Star Map includes bitmap entries having locations indexed by the hash of one or more values associated with one or more join key columns of its associated table. A bitmap entry in a Star Map, if set, indicates the presence of a row in its associated table that has entries in the one or more join key columns that together hash to the location of the bitmap entry. The method includes a) logically ANDing the Star Maps S1 through SN to produce Star Map SJ, b) for each set bitmap entry in SJ, searching T1 through TN for rows having values in their one or more join key columns that hash to the location of the set bitmap entry, and c) joining the resulting rows to produce a join result.

Implementations of the invention may include one or more of the following. The method may include determining the cardinality of the join result and if the cardinality is less than a predefined threshold value, performing a) through c); and if the cardinality is greater than the predefined threshold value, not performing a) through c). Logically ANDing the Star Maps may include setting an entry in SJ having a location defined by a hash value if the entries in all of S1 through SN having locations defined by the hash value are set. Logically ANDing the Star Maps may includes a1) performing a logical AND of S1 and S2 to produce SJ; a2) setting i to 3; a3) while i is less than or equal to N, performing a4) through a6), a4) performing a logical AND of Si with SJ to form Stemp, a5) setting SJ equal to Stemp, and a6) incrementing i.

S1 through SN and SJ may be the same size and performing a logical AND of Si with SJ to form Stemp may include ANDing the entry at a location in Si defined by a hash value with the entry at a location in SJ defined by the hash value. Each of T1 through TN may be indexed by the hash of the combined entries in its respective one or more join key columns, and searching T1 through TN for rows having values in its one or more columns that hash to the location of the set bitmap entry may include using the hash value associated with the location of the set bitmap entry as an index to retrieve rows from tables T1 through TN.

One or more of the Star Maps may be a table and a first portion of the hash value that indexes the locations of a Star Map may define a row within the Star Map and a second portion of the hash value may define an offset within the defined row. The first portion may be the first half of the hash value and the second portion is the second half of the hash value. The hash value may be 32 bits long, the first portion may be the first 16 bits of the hash value, and the second portion may be the second 16 bits of the hash value. At least one of tables T1 through TN may be ordered by the values of its one or more join key columns. Each entry in a Star Map may be one bit. Each entry in a Star Map may be sixteen bits. Each Star Map entry may include one or more bits and each bit may correspond to the hash of one or more values associated with the one or more join key columns of its associated table.

In general, in another aspect, the invention features a computer program, stored on a tangible storage medium, for use in joining a plurality of tables T1 through TN. Each of the tables has an associated Star Map, S1 through SN, respectively. Each Star Map includes bitmap entries having locations indexed by the hash of one or more values associated with one or more join key columns of its associated table. A bitmap entry in a Star Map, if set, indicates the presence of a row in its associated table that has entries in the one or more join key columns that together hash to the location of the bitmap entry. The program includes executable instructions that cause a computer to a) logically AND the Star Maps S1 through SN to produce Star Map SJ, b) for each set bitmap entry in SJ, search T1 through TN for rows having values in their one or more join key columns that hash to the location of the set bitmap entry, and c) join the resulting rows to produce a join result.

In general, in another aspect, the invention features a database system for accessing a database. The database system includes a massively parallel processing system which includes one or more nodes, a plurality of CPUs, each of the one or more nodes providing access to one or more CPUs, a plurality of virtual processes each of the one or more CPUs providing access to one or more processes, each process configured to manage data stored in one of a plurality of data-storage facilities, a plurality of tables T1 through TN. Each table is distributed among the data-storage facilities. Each of the tables has an associated Star Map, S1 through SN, respectively. Each Star Map is distributed among the data-storage facilities. Each Star Map includes bitmap entries having locations indexed by the hash of one or more values associated with one or more join key columns of its associated table. A bitmap entry in a Star Map, if set, indicates the presence of a row in its associated table that has entries in the one or more join key columns that together hash to the location of the bitmap entry. A join process executed on one or more of the plurality of CPUs causes the CPUs to a) logically AND the Star Maps S1 through SN to produce Star Map SJ, b) for each set bitmap entry in SJ, search T1 through TN for rows having values in their one or more join key columns that hash to the location of the set bitmap entry, and c) join the resulting rows to produce a join result.

In general, in another aspect, the invention features a data structure stored in a memory for use in performing a join in a database management system executed by a computer. The data structure includes a Star Map associated with a table referenced in a query. The Star Map includes bitmap entries having locations indexed by a combination of one or more values associated with one or more join key columns of its associated table. A bitmap entry in the Star C Map, if set, indicates the presence of a row in the associated table that has entries in the one or more join key columns that, when combined, identify the location of the bitmap entry.

In general, in another aspect, the invention features a method for joining a plurality of tables T1 through TN, where each of the tables has an associated Star Map, S1 through SN, respectively. Each Star Map includes bitmap entries having locations indexed by one or more values associated with a join key column of its associated table. A bitmap entry in a Star Map, if set, indicates the presence of a row in its associated table that has an entry in the join key column that identifies the location of the bitmap entry. The method includes a) performing a Boolean operation using the bitmap entries of the Star Maps S1 through SN to produce a join Star Map SJ, b) using SJ to select rows from the tables T1 through TN, and c) joining the resulting rows to produce a join result.

Implementations of the invention may include one or more of the following. Using SJ to select rows from the tables T1 through TN may include for each set bitmap entry in SJ, searching T1 through TN for rows having values in their respective join key columns that identify the location of the set bitmap entry. Each bitmap entry in each Star Map may have an associated row number and column number. The row number and the column number for a set bitmap entry in a Star Map may be combined to produce a value that corresponds to the value of the join key column of the Star Map's associated table. At least one of the tables T1 through TN is ordered by the values of its join key column.

Other features and advantages will become apparent from the description and claims that follow.

DETAILED DESCRIPTION

In the following description of the preferred embodiment, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Overview

The present invention comprises a bitmap index structure, known as a Star Map, that improves the performance of large table joins that have low join cardinality, where cardinality is related to the number of rows in the join result. The database system uses hash-based addressing in the Star Map, so that the size of the Star Map is constant and therefore access times are constant. Moreover, access times are independent of the number of rows in the tables being joined, up to a preset limit, which can be altered by a systems administrator. As a result, the Star Map improves the performance of equi-joins where two or more large tables are joined and the cardinality of the join is small (i.e., the join result has a small number of rows).

Environment

Figure 1:
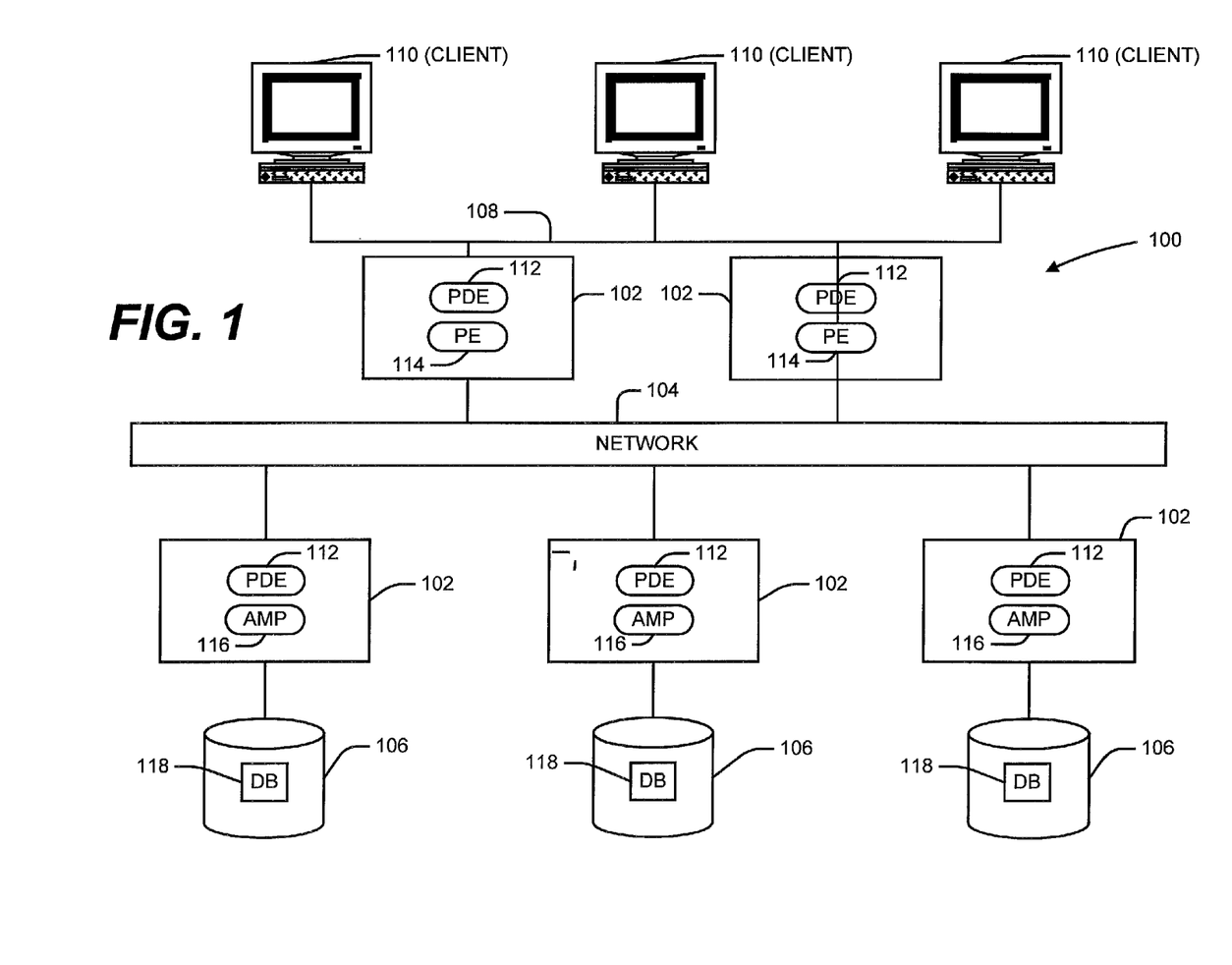
FIG. 1 illustrates an exemplary hardware and software environment that could be used with the preferred embodiment of the present invention.

FIG. 1 illustrates an exemplary hardware and software environment that could be used to implement the database system described below. In the exemplary environment, a computer system 100 is comprised of one or more processing units (PUs) 102, also known as processors or nodes, which are interconnected by a network 104. Each of the PUs 102 is coupled to zero or more fixed and/or removable data storage units (DSUs) 106, such as disk drives, that store one or more relational databases. Further, each of the PUs 102 is coupled to zero or more data communications units (DCUs) 108, such as network interfaces, that communicate with one or more remote systems or devices.

Operators of the computer system 100 typically use a workstation 110, terminal, computer, or other input device to interact with the computer system 100. This interaction generally comprises queries that conform to the Structured Query Language (SQL) standard, and invoke functions performed by a Relational DataBase Management System (RDBMS) executed by the system 100.

In one example, the RDBMS comprises the Teradata® product offered by NCR Corporation, the assignee of the present invention, and includes one or more Parallel Database Extensions (PDEs) 112, Parsing Engines (PEs) 114, and Access Module Processors (AMPs) 116. These components of the RDBMS perform the functions necessary to implement the RDBMS and SQL functions, i.e., definition, compilation, interpretation, optimization, database access control, database retrieval, and database update.

Generally, the PDEs 112, PEs 114, and AMPs 116 are tangibly embodied in and/or accessible from a device, media, carrier, or signal, such as RAM, ROM, one or more of the DSUs 106, and/or a remote system or device communicating with the computer system 100 via one or more of the DCUs 108. The PDEs 112, PEs 114, and AMPs 116 each comprise logic and/or data which, when executed, invoked, and/or interpreted by the PUs 102 of the computer system 100, cause the necessary steps or elements described below to be performed.

Those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

In an example system, work is divided among the PUs 102 in the system 100 by spreading the storage of a partitioned relational database 118 managed by the RDBMS across multiple AMPs 116 and the DSUs 106 (which are managed by the AMPs 116). Thus, a DSU 106 may store only a subset of rows that comprise a table in the partitioned database 118 and work is managed by the system 100 so that the task of operating on each subset of rows is performed by the AMPs 116 managing the DSUs 106 that store the subset of rows.

The PDEs 112 provide a high speed, low latency, message-passing layer for use in communicating between the PEs 114 and AMPs 116. Further, the PDE 112 is an application programming interface (API) that allows the RDBMS to operate under either the UNIX MP-RAS or WINDOWS NT operating systems, in that the PDE 112 isolates most of the operating system dependent functions from the RDBMS, and performs many operations such as shared memory management, message passing, and process or thread creation.

The PEs 114 handle communications, session control, optimization and query plan generation and control, while the AMPs 116 handle actual database 118 table manipulation. The PEs 114 fully parallelize all functions among the AMPs 116. Both the PEs 114 and AMPs 116 are known as "virtual processors" or "vprocs".

The vproc concept is accomplished by executing multiple threads or processes in a PU 102, wherein each thread or process is encapsulated within a vproc. The vproc concept adds a level of abstraction between the multi-threading of a work unit and the physical layout of the parallel processing computer system 100. Moreover, when a PU 102 itself is comprised of a plurality of processors or nodes, the vproc concept provides for intra-node as well as the inter-node parallelism.

The vproc concept results in better system 100 availability without undue programming overhead. The vprocs also provide a degree of location transparency, in that vprocs communicate with each other using addresses that are vproc-specific, rather than node-specific. Further, vprocs facilitate redundancy by providing a level of isolation/abstraction between the physical node 102 and the thread or process. The result is increased system 100 utilization and fault tolerance.

The system 100 does face the issue of how to divide a query or other unit of work into smaller sub-units, each of which can be assigned to an AMP 116. In one example, data partitioning and repartitioning may be performed, in order to enhance parallel processing across multiple AMPs 116. For example, the database 118 may be hash partitioned, range partitioned, or not partitioned at all (i.e., locally processed).

Hash partitioning is a partitioning scheme in which a predefined hash function and map is used to assign records to AMPs 116, wherein the hashing function generates a hash "bucket" number and the hash bucket numbers are mapped to AMPs 116. Range partitioning is a partitioning scheme in which each AMP 116 manages the records falling within a range of values, wherein the entire data set is divided into as many ranges as there are AMPs 116. No partitioning means that a single AMP 116 manages all of the records.

Execution of SQL Queries

Figure 2:
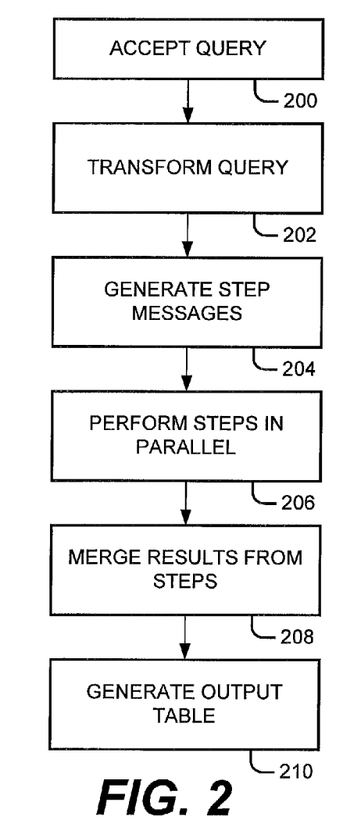
FIG. 2 is a flow chart illustrating the steps necessary for the interpretation and execution of user queries or other SQL statements according to the preferred embodiment of the present invention.

FIG. 2 is a flow chart illustrating the steps necessary for the interpretation and execution of user queries or other SQL statements according to the preferred embodiment of the present invention.

Block 200 represents SQL statements being accepted by the PE 114.

Block 202 represents the SQL statements being transformed by a Compiler or Interpreter subsystem of the PE 114 into an execution plan. Moreover, an Optimizer subsystem of the PE 114 may transform or optimize the execution plan in a manner described in more detail later in this specification.

Block 204 represents the PE 114 generating one or more "step messages" from the execution plan, wherein each step message is assigned to an AMP 116 that manages the desired records. As mentioned above, the rows of the tables in the database 118 may be partitioned or otherwise distributed among multiple AMPs 116, so that multiple AMPs 116 can work at the same time on the data of a given table. If a request is for data in a single row, the PE 114 transmits the steps to the AMP 116 in which the data resides. If the request is for multiple rows, then the steps are forwarded to all participating AMPs 116. Since the tables in the database 118 may be partitioned or distributed across the DSUs 106 of the AMPs 116, the workload of performing the SQL query can be balanced among AMPs 116 and DSUs 106.

Block 204 also represents the PE 114 sending the step messages to their assigned AMPs 116.

Block 206 represents the AMPs 116 performing the required data manipulation associated with the step messages received from the PE 114, and then transmitting appropriate responses back to the PE 114.

Block 208 represents the PE 114 merging the responses that come from the AMPs 116.

Block 210 represents the output or result table being generated.

Equi-Join Operation

Figure 3:
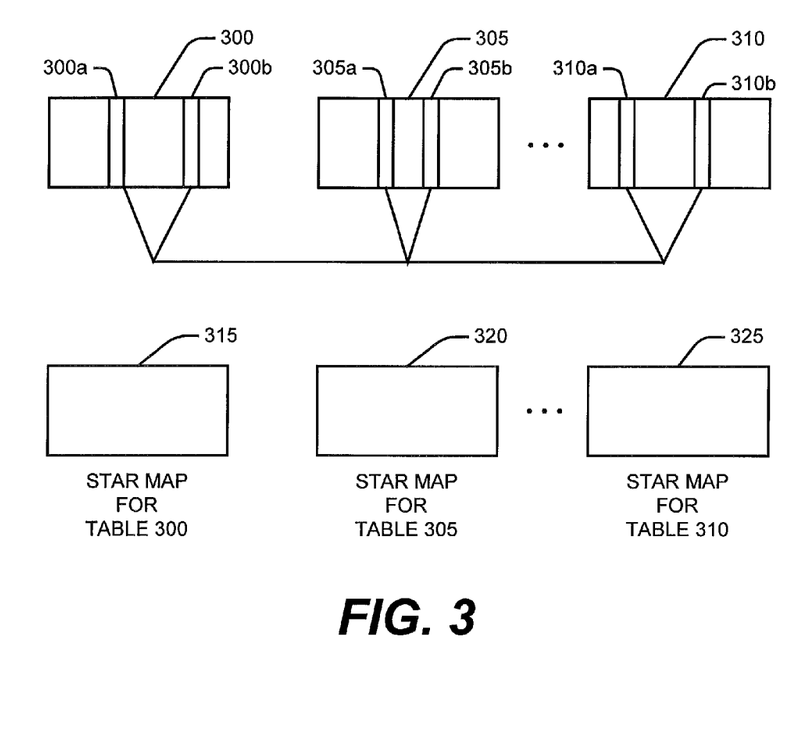
FIG. 3 is a representation of a three-table join and Star Maps associated with the three tables.

FIG. 3 is a query graph that represents an equi-join operation, wherein the boxes 300, 305, and 310 represent tables, and the lines between join key columns 300a, 300b, 305a, 305b, 310a, and 310b of the tables 300, 305, and 310, respectively, represent the join to be executed. The ellipsis between boxes 305 and 310 indicates that any number of additional tables may be involved in the join. It will be apparent to persons of ordinary skill that the principles described herein will apply to any equi-join involving two or more tables and to any join in which there are one or more join key columns.

An exemplary SQL query for performing the equi-join operation shown in FIG. 3 would be the following:
SELECT <list of columns>
FROM 300, 305, 310, <list of additional tables, if required>
WHERE
300.300a=305.305a AND
300.300a=310.310a AND
300.300b=305.305b AND
300.300b=310.310b AND
<other selection criteria>

In this example, the tables 300, 305, and 310 are joined according to equivalence relations indicated in the query. A typical execution plan for the exemplary SQL query would be to perform a sequence of binary joins between the tables 300, 305, and 310. It is the job of the Optimizer subsystem of the PE 114, at step 202 of FIG. 2, to select a least costly binary join order.

In a join such as that illustrated in FIG. 3, there may be numerous unnecessary accesses to the tables 300, 305 and 310 when performing the join operations. Consider one example using FIG. 3. Assume that each of the three tables 300, 305 and 310 has approximately 1 billion rows, and the join operation produces only 100,000 result rows. In this example, a large percentage of the accesses to the tables 300, 305 and 310 are unnecessary.

Star Maps 315, 320, 325 associated with each table 300, 305, 310, respectively, can be used to minimize unnecessary accesses to the tables 300, 305, 310. The Star Maps 315, 320, 325 are bitmap index structures used to filter accesses to the tables 300, 305 and 310, i.e., to determine whether join operations among the tables 300, 305 and 310 would be productive.

Star Map Structure

Figure 4:
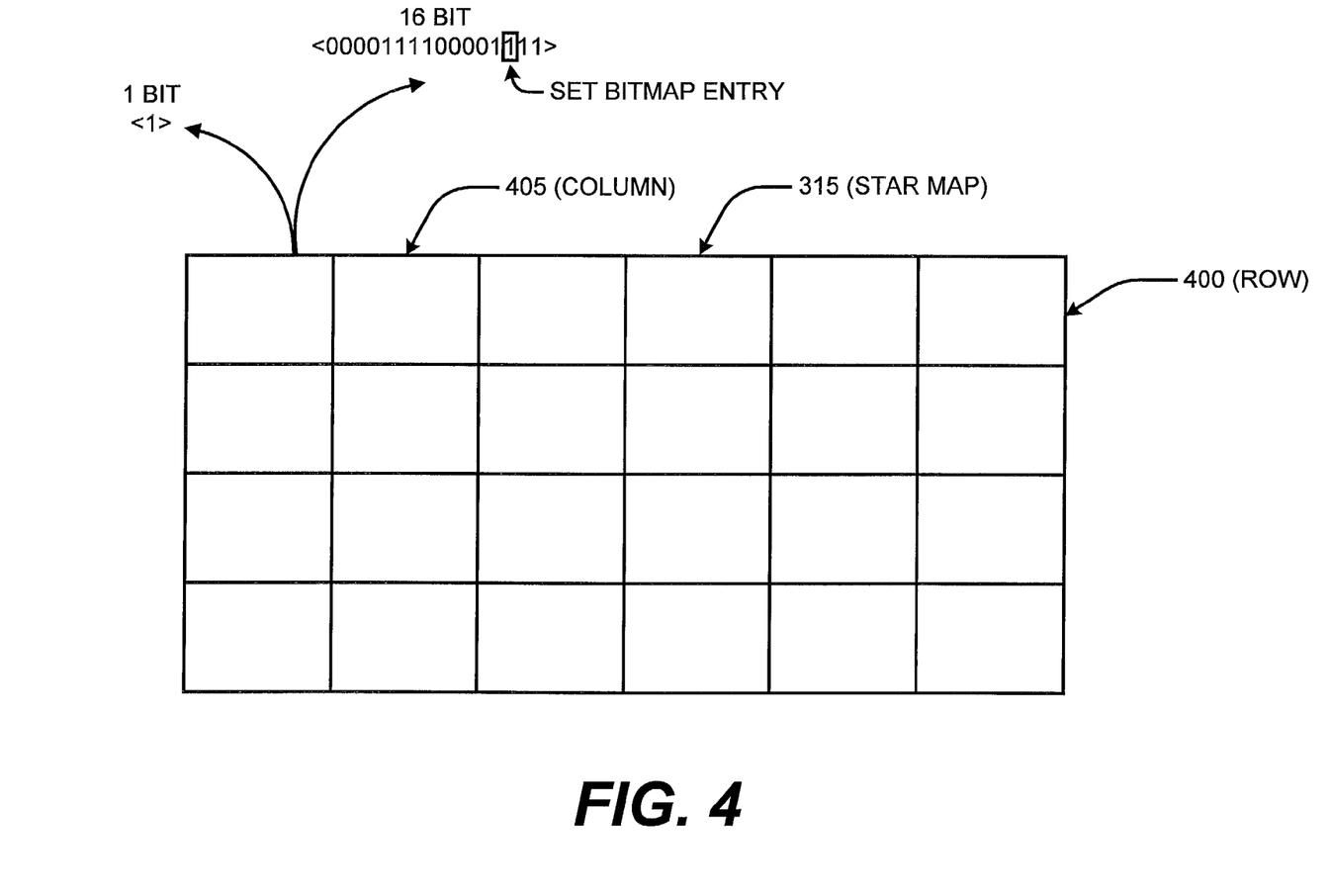
FIG. 4 is a block diagram that illustrates the structure of a Star Map according to the preferred embodiment of the present invention.

An example structure for a Star Map will now be discussed in relation to Star Map 315. It will be understood that this discussion will be equally applicable to the other Star Maps 320, 325 illustrated in FIG. 3. The example Star Map 315, which is associated with table 300, includes a plurality of rows 400, wherein each row includes a plurality of columns 405, as shown in FIG. 4. In one example, the Star Map 315 includes 64K rows 400, each of the rows 400 includes 64K columns 405, and each of the columns 405 comprises either a 1-bit or a 16-bit value. In one example, a bit in the 1-bit value having a value "1", rather than "0", is referred to as a "set bitmap entry." When the number of rows 400 of the Star Map 315 is 64K and each row 400 has 64K columns 405, then the Star Map 315 can map approximately 232 or 4 billion rows in its associated table 300 when the column 405 comprises a 1-bit value or 236 or 64 billion rows in its associated table 300 when the column 405 comprises a 16-bit value.

The number of rows 400, the number of columns 405, the size of each column 405 value, and the hashing functions used are determined and fixed at creation time, depending on the cardinality of the table being represented. Of course, those skilled in the art will recognize that any number of rows 400, any number of columns 405, any size of column 405 value, and any number of different hashing functions could be used without departing from the scope of the present invention. Further, those skilled in the art will recognize that the Star Map 315 may take a form different from the form illustrated in FIG. 4, such as an ordered sequence of bits, bytes, or words, without departing from the scope of the present invention.

One or more join columns of the table 300 associated with the Star Map 315 are used to generate the column 405 values of the Star Map 315, wherein the join columns usually comprise a partition index, or a primary index. With some additional enhancements, a secondary index of the table can be used. Depending on the structure of the data base and its indexes any other suitable index can be used. The primary index of the table is used in the following examples. In the example shown in FIG. 3, the join key columns 300a, 300b, 305a, 305b, 310a, and 310b are used to generate the respective Star Maps 315, 320 and 325, respectively.

In one example, the table's 300 join key columns 300a and 300b are concatenated, or combined in some other way, and then hashed to generate a 32-bit hash-row value. This 32-bit hash-row value is then used to address the Star Map 315. In one example, the upper 16 bits of the 32-bit hash-row value are used to select a row 400 of the Star Map 315 and the lower 16 bits of the 32-bit hash-row value are used to select a column 405 of the selected row 400 of the Star Map 315. The column 405 value indicates whether the corresponding row may exist in the table 300 associated with the Star Map 315. If the selected column 405 value is set, then the corresponding row might exist in the table 300; otherwise, the row would not exist in the table 300.

When the number of rows in the table 300 associated with the Star Map 315 is less than 4 billion, and when there is not significant skew in the join column values of its associated table, then each column 405 of the Star Map 315 may only comprise a 1-bit value to indicate whether the corresponding record exists in the table 300. However, when the number of rows in the table exceeds 4 billion, or when there is significant skew in the join columns of the table 300 associated with the Star Map, then additional bits may be added to each column 405 of the Star Map 315, so that a single column 405 can be used for multiple hash-row values of its associated table 300, in order to deal with hash collisions.

In one example, each column 405 within a row 400 of the Star Map 315 selected by the hash-row value of the table 300 associated with the Star Map 315 may comprise 16 bits. In that case, each hash-row value of the table 300 would select both a row 400 and a column 405 of the Star Map 315, and then another hash function would be performed on the join columns of the table 300 to select one of the bits within the selected column 405. If the selected bit is set, then the corresponding row might exist in the table 300; otherwise, the row would not exist in the table 300. Of course, there would still be the possibility of hash collisions, even with the larger columns 405 of the Star Map 315.

The Star Map 315 is updated whenever changes are made to its associated table 300. For example, when a row is inserted into the associated table 300, a corresponding column 405 value in a corresponding row 400 of the Star Map 315 is set. Similarly, when a row is deleted from the table 300, a corresponding column 405 value in a corresponding row 400 of the Star Map 315 is reset, taking hash collisions into account. When a row is updated in the associated table 300, a column 405 value in a row 400 of the Star Map 315 corresponding to the new hash-row value and new column values are set, while a column 405 value in a row 400 of the Star Map 315 corresponding to the old hash-row value and column values are reset, while taking hash collisions into account.

The number of bits stored in each of the 64K columns 405 of the Star Map 315 is called the "degree" of the Star Map 315 and determines the size of each row 400 in the Star Map 315. For example, a Star Map 315 of degree 1 has a row 400 length of 8 K bytes, while a Star Map 315 of degree 16 has a row 400 length of 128 K bytes. Generally, the degree of the Star Map 315 may be implemented as a parameter, so that the row size can be set to any desired value.

In the examples described above, the total size of the Star Map 315 is either 512 MB (a Star Map 315 of degree 1) or 8192 MB (a Star Map 315 of degree 16), respectively. The Star Map 315 may be partitioned across PUs 102 (for example, in a manner similar to the table) according to the upper 16 bits of the 32-bit hash-row value. Therefore, in a 20-node system 100, each PU 102 would store approximately 25 MB (a Star Map 315 of degree 1) or 410 MB (a Star Map 315 of degree 16) of a partitioned Star Map 315, respectively. Similarly, in a 96-node system, each PU 102 would manage approximately 5 MB (a Star Map 315 of degree 1) or 85 MB (a Star Map 315 of degree 16) of a partitioned Star Map 315, respectively. Partitions of these sizes may fit entirely within the main memory of the PUs 102.

Logic of the Join Algorithm

Star Maps can make the execution of joins involving a set of tables T1 through TN more efficient. Assume that each of the tables T1 through TN has an associated Star Map, S1 through SN, respectively. To perform a join, the system first performs a Boolean operation (such as a logical AND, OR, XOR, NAND, etc., or a combination of such operations) using the bitmap entries of the Star Maps S1 through SN to produce a join Star Map SJ. The system then uses SJ to select rows from the tables T1 through TN. For example, the system may use set bitmap entries in SJ as keys to select rows from T1 through TN. In one example, the hash value of the row or rows to be selected can be derived by concatenating the 16 bit Star Map row position and the 16 bit Star Map column position of a set bitmap entry to create a 32 bit hash value. Tables T1 through TN can then be searched for rows that hash to that hash value. Depending on the hash algorithm, the search can result in the retrieval of more than one row from a given table or tables. However, reconstruction of a hash value in any kind of Star Map environment can be performed very easily. Alternatively, the system may use unset bitmap entries in SJ as keys.

The system joins the resulting rows to produce a join result. Under certain circumstances, determined by the query, the Boolean operation being performed, and other factors including the size of SJ and the size of the tables T1 through TN, such a system will access fewer rows in T1 through TN to perform the join, thereby reducing the cost of the query.

Figure 5:
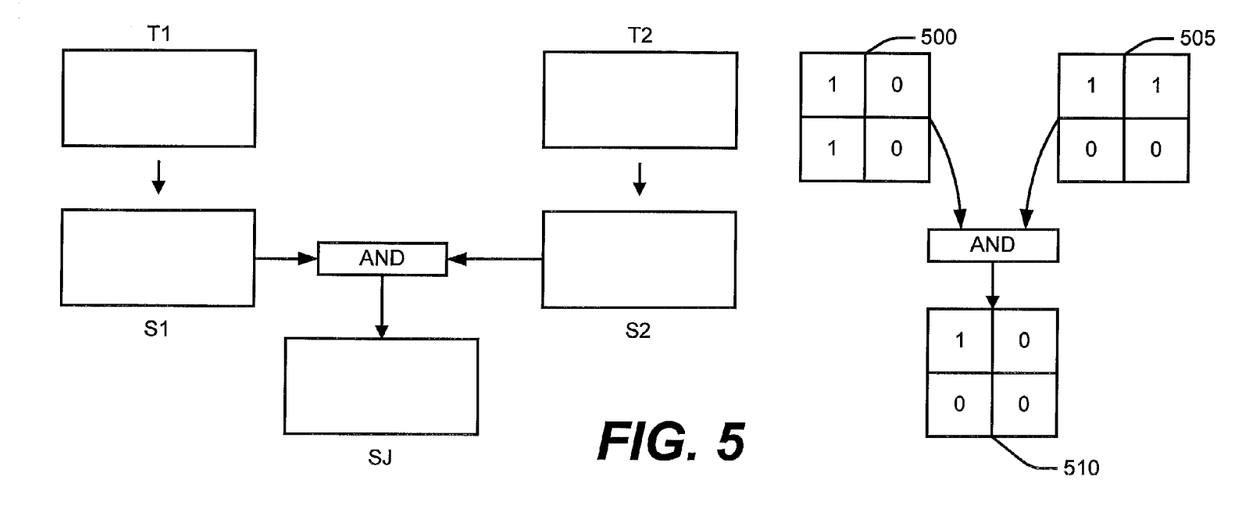
FIG. 5 is a block diagram of a method for joining two tables using Star Maps.
Figure 6:
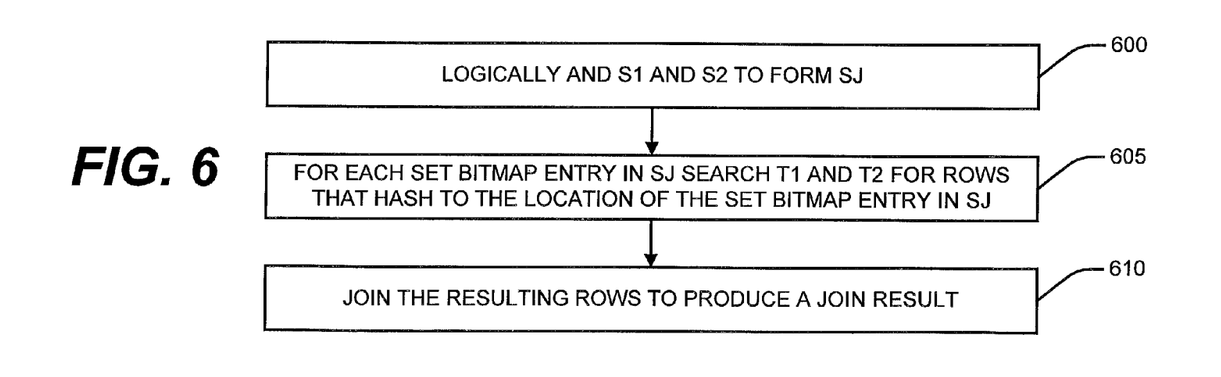
FIG. 6 is a flow chart of a method for joining two tables using Star Maps.

Use of Star Maps to perform an equi-join using Star Maps for a join between two tables, T1 and T2 having Star Maps S1 and S2, respectively, is illustrated in FIG. 5. The join is performed by logically ANDing S1 and S2 to form a join Star Map SJ (block 600), as shown in FIG. 6. In one example, S1 and S2 are the same size and are created using the same hashing algorithm. In that case, ANDing the two Star Maps together requires applying a logical AND function to corresponding entries from the two Star Maps. An entry in the join Star Map is set only if the corresponding entries in S1 and S2 are set.

This is illustrated in FIG. 5, which shows two very simple Star Maps 500, 505, each having two rows and two columns. When they are ANDed together, only the first column of the first row of the join Star Map 510 is set. This is because the corresponding row and column are the only ones set to "1" in both source Star Maps 500 and 505.

A person of ordinary skill will recognize that it is not necessary for S1 and S2 to be the same size, be created using the same hash function or have the same mapping of hash values. If any of those parameters or any other parameter or parameters of S1 and S2 are different, the system will make the necessary adjustments between the two Star Maps prior to performing the AND function or as the AND function is being performed, assuming that S1 and S2 are sufficiently similar to allow such adjustments to be made. Persons of ordinary skill will also recognize that the AND function can be accomplished using other equivalent Boolean expressions, such as, for example, expressions equivalent to the AND function by virtue of DeMorgan's Law.

The resulting join Star Map SJ contains bitmap entries, which, when set, indicate that both T1 and T2 may contain rows that hash to the location of the set bitmap entry in the Star Map SJ. Consequently, joins between those sets of rows may contribute to the join result. If a bitmap entry in the Star Map SJ is not set then one of T1 or T2 does not contain any rows that hash to the location of that bitmap entry in the Star Map SJ. Consequently, joins between those sets of rows would not contribute to the join result.

Taking advantage of this characteristic, the system searches T1 and T2 for rows that hash to the location of each of the set bitmap entries in join Star Map SJ (block 605). The system then Joins the resulting rows to produce a join result (block 610). By joining only those rows that hash to locations of set bitmap entries in the join Star Map SJ, the system avoids accessing those rows in T1 and T2 that would not contribute to the join result, thereby saving time and cost in performing the join. If instead of a hash value, an actual column value is used to set the bitmap, then there would not even be a need to probe the base tables. However, this causes a limitation in the value range which, for example, could not exceed 4 billion for a degree 1 bitmap. To extend this range higher values, for example two 32 bit values or any other higher sized value could be used. It can be recognized that using an actual column value to set the bitmap also enables other key features that result in performance enhancements for qualifications based on range comparisons and joins that are not based on equality conditions (not equi-joins but joins such as T1.column>T2.column).

The use of Star Maps to perform join operations adds overhead to the join operation. The Star Maps for the tables must be read and logically ANDed to create the join Star Map and the base tables T1 and T2 must be searched for rows identified by the join Star Map. Above a threshold value of join result cardinality, the use of Star Maps as described above to perform joins will be less efficient than using traditional join methods. Thus, in one example system, the system will not apply the Star Map method described above if the join result cardinality is greater than a predetermined threshold. Cardinality of the join result may be predicted by the optimizer prior to performing the join based on statistics and operation cost collected by the system.

Figure 7:
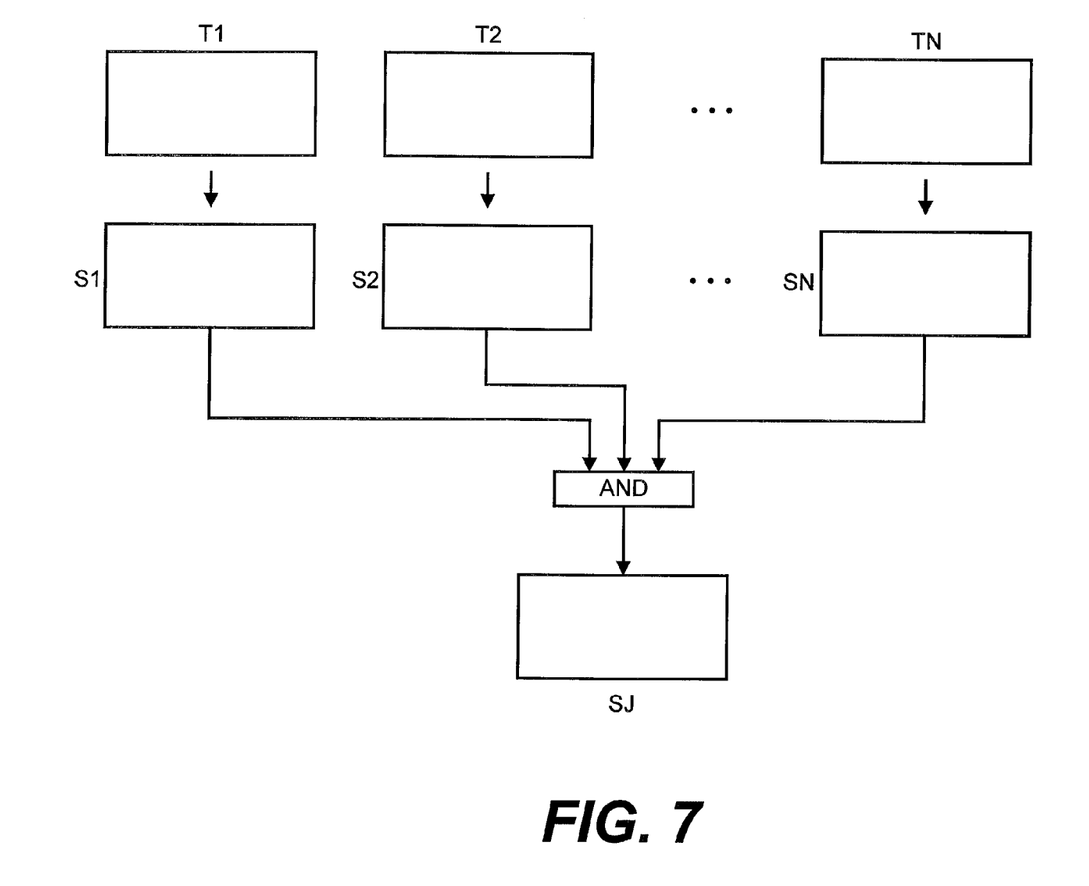
FIG. 7 is a block diagram of a method for joining N tables using Star Maps.
Figure 8:
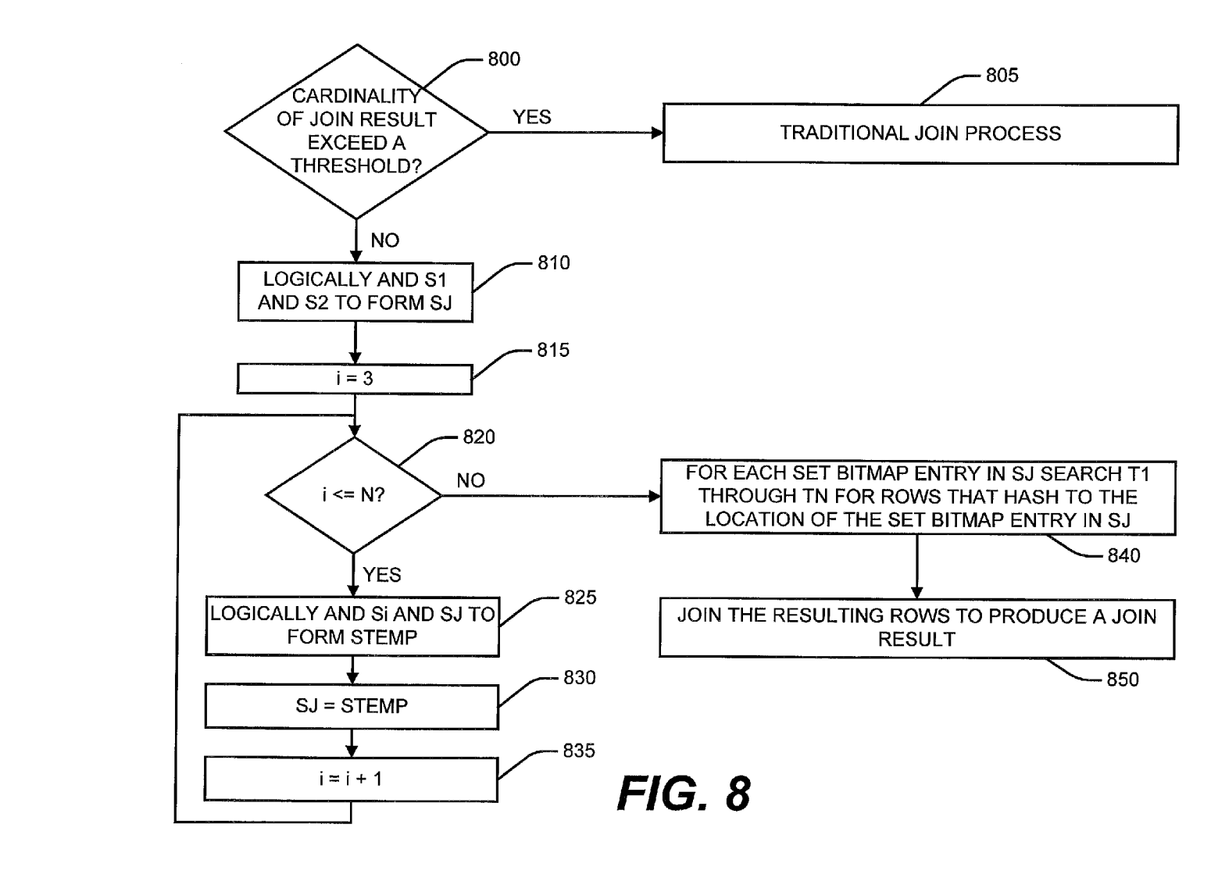
FIG. 8 is a flow chart of a method for joining N tables using Star Maps.

A similar algorithm may be applied if the number of tables involved in the join is greater than two, as shown in FIG. 7. In this scenario, an arbitrary number N of tables T1 through TN is involved in the query and Star Maps S1 through SN have been created for each respective table. If the cardinality of the search result is greater than a predetermined threshold (block 800), as shown in FIG. 8, the system will use traditional join techniques to perform the join (block 805).

If the cardinality of the search report is less than the predetermined threshold, the system will logically AND all of the Star Maps S1 through SN to form a join Star Map SJ. To accomplish this, the system first logically ANDs S1 and S2 to form the join Star Map SJ (block 815). The system then enters a loop in which it ANDs the remaining Star Maps (S3 through SN) with the join Star Map SJ to produce a final join Star Map SJ. The system first initializes a counter (i) by setting it to 3 (block 815). The system then determines if the index is less than or equal to N (block 820). If it is, indicating that not all of the Star Maps have been ANDed into the join Star Map, the system ANDs the next Star Map, Si, with the join Star Map to form a temporary Star Map Stemp (block 825). The system then sets the join Star Map SJ equal to the temporary Star Map Stemp (block 830), increments the index i (block 835) and returns to the beginning of the loop (block 820).

Once all of the Star Maps, S1 through SN have been ANDed together, the index i will be greater than N and the system will operate as described above with respect to FIG. 6. For each set bitmap entry in SJ, the system will search T1 through TN for rows that hash to the location of the set bitmap entry in SJ (block 840). The system will then join the resulting rows to produce a join result (block 845).

CONCLUSION

This concludes the description of the preferred embodiment of the invention. The following describes some alternative embodiments for accomplishing the same invention. In one alternative embodiment, any type of computer, such as a mainframe, minicomputer, or personal computer, could be used to implement the present invention. In addition, any DBMS that performs equi-joins could benefit from the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for joining a plurality of tables T1 through TN, where each of the tables has an associated Star Map, S1 through SN, respectively, and each Star Map includes bitmap entries having locations indexed by a hash of one or more values associated with one or more join key columns of its associated table, where a bitmap entry in a Star Map, if set, indicates a row is present in its associated table that has entries in the one or more join key columns that together hash to the location of the bitmap entry, the method including:
   a) performing a Boolean operation using the bitmap entries of the Star Maps S1 through SN to produce a join Star Map SJ;
   b) using SJ to select rows from the tables T1 through TN; and
   c) joining the resulting rows to produce a join result.

2. The method of claim 1 where the Boolean operation includes a logical AND.

3. The method of claim 1 where using SJ to select rows from the tables T1 through TN includes for each set bitmap entry in SJ, searching T1 through TN for all rows having values in their one or more join key columns that hash to the location of the set bitmap entry.

4. The method of claim 3 where
   each bitmap entry in each Star Map has an associated row number and column number;
   the row number and the column number for a set bitmap entry in a Star Map can be combined to produce a value that corresponds to the hash value of the one or more join key columns of the Star Map's associated table; and
   at least one of the tables T1 through TN is ordered by the hash of the values of its one or more join key columns.

5. A method for joining a plurality of tables T1 through TN, where each of the tables has an associated Star Map, S1 through SN, respectively, and each Star Map includes bitmap entries having locations indexed by a hash of one or more values associated with one or more join key columns of its associated table, where a bitmap entry in a Star Map, if set, indicates a row is present in its associated table that has entries in the one or more join key columns that together hash to the location of the bitmap entry, the method including:
   a) logically ANDing the Star Maps S1 through SN to produce Star Map SJ;
   b) for each set bitmap entry in SJ, searching T1 through TN for all rows having values in their one or more join key columns that hash to the location of the set bitmap entry; and
   c) joining the resulting rows to produce a join result.

6. The method of claim 5 where logically ANDing the Star Maps includes setting an entry in SJ having a location defined by a hash value if the entries in all of S1 through SN having locations defined by the hash value are set.

7. The method of claim 5 where logically ANDing the Star Maps includes a1) performing a logical AND of S1 and S2 to produce SJ;
   a2) setting i to 3;
   a3) while i is less than or equal to N, performing a4) through a6);

a4) performing a logical AND of Si with SJ to form Stemp;
a5) setting SJ equal to Stemp; and
a6) incrementing i.

8. The method of claim 7 where S1 through SN and SJ are the same size and performing a logical AND of Si with SJ to form Stemp includes
ANDing the entry at a location in Si defined by a hash value with the entry at a location in SJ defined by the hash value.

9. The method of claim 5 where each of T1 through TN are indexed by the hash of the combined entries in its respective one or more join key columns, and searching T1 through TN for rows having values in its one or more columns that hash to the location of the set bitmap entry includes
using the hash value associated with the location of the set bitmap entry as an index to retrieve rows from tables T1 through TN.

10. The method of claim 5 where one or more of the Star Maps is a table and a first portion of the hash value that indexes the locations of a Star Map defines a row within the Star Map and a second portion of the hash value defines an offset within the defined row.

11. The method of claim 10 where the first portion is the first half of the hash value and the second portion is the second half of the hash value.

12. The method of claim 10 where the hash value is 32 bits long, the first portion is the first 16 bits of the hash value, and the second portion is the second 16 bits of the hash value.

13. The method of claim 5 where
at least one of tables T1 through TN is ordered by the values of its one or more join key columns.

14. The method of claim 5 where each entry in a Star Map is one bit.

15. The method of claim 5 where each entry in a Star Map is sixteen bits.

16. The method of claim 5 where each Star Map entry includes one or more bits and each bit corresponds to the hash of one or more values associated with the one or more join key columns of its associated table.

17. A computer program, stored on a tangible storage medium, for use in joining a plurality of tables T1 through TN, where each of the tables has an associated Star Map, S1 through SN, respectively, and each Star Map includes bitmap entries having locations indexed by a hash of one or more values associated with one or more join key columns of its associated table, where a bitmap entry in a Star Map, if set, indicates a row is present in its associated table that has entries in the one or more join key columns that together hash to the location of the bitmap entry, the program including executable instructions that cause a computer to
a) logically AND the Star Maps S1 through SN to produce Star Map SJ;
b) for each set bitmap entry in SJ, search T1 through TN for all rows having values in their one or more join key columns that hash to the location of the set bitmap entry; and
c) join the resulting rows to produce a join result.

18. The computer program of claim 17 where when logically ANDing the Star Maps the computer
sets an entry in SJ having a location defined by a hash value if the entries in all of S1 through SN having locations defined by the hash value are set.

19. The computer program of claim 17 where when logically ANDing the Star Maps the computer
a1) performs a logical AND of S1 and S2 to produce SJ;
a2) sets i to 3;
a3) while i is less than or equal to N, performs a4) through a6);
a4) performs a logical AND of Si with SJ to form Stemp;
a5) sets SJ equal to Stemp;
a6) increments i.

20. The computer program of claim 19 where S1 through SN and SJ are the same size and when performing a logical AND of Si with SJ to form Stemp the computer
ANDs the entry at a location in Si defined by a hash value with the entry at a location in SJ defined by the hash value.

21. The computer program of claim 17 where each of T1 through TN are indexed by the hash of the combined entries in its respective one or more join key columns, and when searching T1 through TN for rows having values in its one or more columns that hash to the location of the set bitmap entry the computer
uses the hash value associated with the location of the set bitmap entry as an index to retrieve rows from tables T1 through TN.

22. The computer program of claim 17 where one or more of the Star Maps is a table and a first portion of the hash value that indexes the locations of a Star Map defines a row within the Star Map and a second portion of the hash value defines an offset within the defined row.

23. The computer program of claim 22 where the first portion is the first half of the hash value and the second portion is the second half of the hash value.

24. The computer program of claim 22 where the hash value is 32 bits long, the first portion is the first 16 bits of the hash value, and the second portion is the second 16 bits of the hash value.

25. The computer program of claim 17 where
at least one of tables T1 through TN is ordered by the values of its one or more join key columns.

26. The computer program of claim 17 where each entry in a Star Map is one bit.

27. The computer program of claim 17 where each entry in a Star Map is sixteen bits.

28. The computer program of claim 17 where each Star Map entry includes one or more bits and each bit corresponds to the hash of one or more values associated with the one or more join key columns of its associated table.

29. A database system for accessing a database, the database system including
a massively parallel processing system including
one or more nodes;
a plurality of CPUs, each of the one or more nodes providing access to one or more CPUs;
a plurality of virtual processes each of the one or more CPUs providing access to one or more processes;
each process configured to manage data stored in one of a plurality of data-storage facilities;
a plurality of tables T1 through TN, each table being distributed among the data-storage facilities;
each of the tables having an associated Star Map, S1 through SN, respectively, each Star Map being distributed among the data-storage facilities,
each Star Map including bitmap entries having locations indexed by a hash of one or more values associated with one or more join key columns of its associated table, where a bitmap entry in a Star Map, if set, indicates a row is present in its associated table that has entries in the one or more join key columns that together hash to the location of the bitmap entry;

a join process executed on one or more of the plurality of CPUs that cause the CPUs to
   a) logically AND the Star Maps S1 through SN to produce Star Map SJ;
   b) for each set bitmap entry in SJ, search T1 through TN for all rows having values in their one or more join key columns that hash to the location of the set bitmap entry; and
   c) join the resulting rows to produce a join result.

30. The database system of claim 29 where when logically ANDing the Star Maps the process
   sets an entry in SJ having a location defined by a hash value if the entries in all of S1 through SN having locations defined by the hash value are set.

31. The database system of claim 29 where when logically ANDing the Star Maps the process
   a1) performs a logical AND of S1 and S2 to produce SJ;
   a2) sets i to 3;
   a3) while i is less than or equal to N, performs a4) through a6);
   a4) performs a logical AND of Si with SJ to form Stemp;
   a5) sets SJ equal to Stemp;
   a6) increments i.

32. The database system of claim 31 where S1 through SN and SJ are the same size and when performing a logical AND of Si with SJ to form Stemp the process
   ANDs the entry at a location in Si defined by a hash value with the entry at a location in SJ defined by the hash value.

33. The database system of claim 29 where each of T1 through TN are indexed by the hash of the combined entries in its respective one or more join key columns, and when searching T1 through TN for rows having values in its one or more columns that hash to the location of the set bitmap entry the process
   uses the hash value associated with the location of the set bitmap entry as an index to retrieve rows from tables T1 through TN.

34. The database system of claim 29 where one or more of the Star Maps is a table and a first portion of the hash value that indexes the locations of a Star Map defines a row within the Star Map and a second portion of the hash value defines an offset within the defined row.

35. The database system of claim 34 where the first portion is the first half of the hash value and the second portion is the second half of the hash value.

36. The database system of claim 34 where the hash value is 32 bits long, the first portion is the first 16 bits of the hash value, and the second portion is the second 16 bits of the hash value.

37. The database system of claim 29 where
   at least one of tables T1 through TN is ordered by the values of its one or more join key columns.

38. The database system of claim 29 where each entry in a Star Map is one bit.

39. The database system of claim 29 where each entry in a Star Map is sixteen bits.

40. The database system of claim 29 where each Star Map entry includes one or more bits and each bit corresponds to the hash of one or more values associated with the one or more join key columns of its associated table.

41. A method for joining a plurality of tables T1 through TN to produce a join result, where each of the tables has an associated Star Map, S1 through SN, respectively, and each Star Map includes bitmap entries having locations indexed by a hash of one or more values associated with one or more join key columns of its associated table, where a bitmap entry in a Star Map, if set, indicates a row is present in its associated table that has entries in the one or more join key columns that together hash to the location of the bitmap entry, the method including:
   predicting cardinality of the join result;
   determining if the predicted cardinality is less than or equal to a predefined threshold value; and
   when the predicted cardinality is less than or equal to a predefined threshold value,
   logically ANDing the Star Maps S1 through SN to produce Star Map SJ,
   for each set bitmap entry in SJ, searching T1 through TN for all rows having values in their one or more join key columns that hash to the location of the set bitmap entry, and
   joining the resulting rows to produce the join result.

42. A computer program, stored on a tangible storage medium, for use in joining a plurality of tables T1 through TN to produce a join result, where each of the tables has an associated Star Map, S1 through SN, respectively, and each Star Map includes bitmap entries having locations indexed by a hash of one or more values associated with one or more join key columns of its associated table, where a bitmap entry in a Star Map, if set, indicates a row is present in its associated table that has entries in the one or more join key columns that together hash to the location of the bitmap entry, the program including executable instructions that cause a computer to
   predict cardinality of the join result;
   determine if the predicted cardinality is less than or equal to a predefined threshold value; and
   when the predicted cardinality is less than or equal to a predefined threshold value logically AND the Star Maps S1 through SN to produce Star Map SJ,
   for each set bitmap entry in SJ, search T1 through TN for all rows having values in their one or more join key columns that hash to the location of the set bitmap entry, and
   join the resulting rows to produce the join result.

43. A database system for accessing a database, the database system including
   a massively parallel processing system including
      one or more nodes;
      a plurality of CPUs, each of the one or more nodes providing access to one or more CPUs;
      a plurality of virtual processes each of the one or more CPUs providing access to one or more processes;
      each process configured to manage data stored in one of a plurality of data-storage facilities;
      a plurality of tables T1 through TN, each table being distributed among the data-storage facilities;
      each of the tables having an associated Star Map, S1 through SN, respectively, each Star Map being distributed among the data-storage facilities,
      each Star Map including bitmap entries having locations indexed by a hash of one or more values associated with one or more join key columns of its associated table, where a bitmap entry in a Star Map, if set, indicates a row is present in its associated table that has entries in the one or more join key columns that together hash to the location of the bitmap entry;

a join process executed on one or more of the plurality of CPUs to produce a join result that cause the CPUs to
predict cardinality of the join result;
determine if the predicted cardinality is less than or equal to a predefined threshold value; and
when the predicted cardinality is less than or equal to a predefined threshold value logically AND the Star Maps S1 through SN to produce Star Map SJ, for each set bitmap entry in SJ, search T1 through TN for all rows having values in their one or more join key columns that hash to the location of the set bitmap entry, and
join the resulting rows to produce the join result.

* * * * *